United States Patent
Jeong et al.

(10) Patent No.: US 8,593,610 B2
(45) Date of Patent: Nov. 26, 2013

(54) LIQUID CRYSTAL DISPLAY DEVICE

(75) Inventors: In-Woo Jeong, Yongin (KR); Ki-Sik Park, Yongin (KR); Dong-Hun Jung, Yongin (KR); Ji-Tae Kim, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 139 days.

(21) Appl. No.: 13/106,414

(22) Filed: May 12, 2011

(65) Prior Publication Data

US 2011/0279750 A1  Nov. 17, 2011

(30) Foreign Application Priority Data

May 13, 2010  (KR) .................... 10-2010-0045047

(51) Int. Cl.
*G02F 1/1335* (2006.01)
*G02F 1/1345* (2006.01)

(52) U.S. Cl.
USPC ............ 349/149; 349/69; 362/97.3; 362/630; 362/631

(58) Field of Classification Search
USPC .................... 349/69, 149; 362/97.3, 630, 631
See application file for complete search history.

(56) References Cited

U.S. PATENT DOCUMENTS

| 2006/0044828 | A1* | 3/2006 | Kim et al. | 362/613 |
| 2006/0152944 | A1* | 7/2006 | Nakayoshi et al. | 362/631 |
| 2006/0260977 | A1* | 11/2006 | Lee et al. | 206/709 |
| 2007/0115419 | A1* | 5/2007 | Song | 349/150 |
| 2008/0030645 | A1* | 2/2008 | Nam et al. | 349/61 |

FOREIGN PATENT DOCUMENTS

| KR | 10-2006-0090392 A | 8/2006 |
| KR | 10-2006-0093836 A | 8/2006 |
| KR | 10-2006-0125247 A | 12/2006 |
| KR | 10-0722096 B1 | 5/2007 |
| KR | 10-2008-0086635 A | 9/2008 |
| KR | 10-2008-0097778 A | 11/2008 |
| KR | 10-2009-0051601 A | 5/2009 |
| KR | 10-2009-0074423 A | 7/2009 |

OTHER PUBLICATIONS

Korean Registration Determination Certificate dated Oct. 19, 2011 for Korean Patent Application No. KR 10-2010-0045047 which corresponds to captioned U.S. Appl. No. 13/106,414.

* cited by examiner

*Primary Examiner* — Michael Caley
(74) *Attorney, Agent, or Firm* — Knobbe, Martens, Olson & Bear LLP

(57) ABSTRACT

A liquid crystal display device having an improved electrostatic discharge structure includes: a liquid crystal panel on which an image is formed; a light emitting diode (LED) unit for irradiating a backlight to the liquid crystal panel; a chassis in which the liquid crystal panel and the LED unit are installed; a LED circuit board including a LED chip that is installed to electrically contact the chassis and to control the LED unit; and a main circuit board connected to the liquid crystal panel and the LED circuit board. A grounding line is connected to the main circuit board and is formed on the LED circuit board. Accordingly, the static electricity that has flowed from the outside through the chassis 10 may be immediately discharged through the grounding line, and electronic components in the liquid crystal display device may be protected from the static electricity.

5 Claims, 3 Drawing Sheets

LIQUID CRYSTAL DISPLAY DEVICE

CROSS-REFERENCE TO RELATED APPLICATION

This application claims the benefit of Korean Patent Application No. 10-2010-0045047, filed May 13, 2010 in the Korean Intellectual Property Office, the disclosure of which is incorporated herein by reference.

BACKGROUND

1. Field

Aspects of the present invention relates to liquid crystal display devices, and more particularly, to liquid crystal display devices having an improved electrostatic discharge structure.

2. Description of the Related Technology

Recently, liquid crystal display devices have been developed with have the convenience of portability and clear large screens. Thus, thin and durable liquid crystal display devices are required, and to this end, liquid crystal display devices covered with a chassis are preferred.

However, static electricity may easily flow into the above-described liquid crystal display devices from the outside through the chassis. The static electricity from the outside is several to several tens of kV. If this static electricity is not grounded safely, electronic components of the liquid crystal display devices may be greatly damaged. However, if a complex ground line is formed using a conductive tape or electromagnetic interference (EMI) pigments to solve this problem, the costs for manufacturing the liquid crystal display devices and manufacturing slim liquid crystal display devices may be adversely affected.

Accordingly, there is need for liquid crystal display devices having a simple structure in which static electricity flowing through the chassis is safely grounded.

SUMMARY

One or more embodiments of the present invention provide liquid crystal display devices having a simple, improved structure for safely grounding static electricity that has flowed into chassis.

According to an aspect of the present invention, there is provided a liquid crystal display device comprising: a liquid crystal panel on which an image is formed; a light emitting diode (LED) unit for irradiating a backlight to the liquid crystal panel; a chassis in which the liquid crystal panel and the LED unit are installed; a LED circuit board including a LED chip that is installed to electrically contact the chassis and to control the LED unit; and a main circuit board connected to the liquid crystal panel and the LED circuit board, wherein a grounding line connected to the main circuit board is formed on the LED circuit board.

According to an aspect of the invention, the LED circuit board may comprise a base, the grounding line formed on a first surface of the base, a LED wiring that is formed in the same layer as the grounding line and forms a signal path of the LED chip, a cover lay layer covering the LED wiring, and a LED pin and a grounding pin that are respectively formed at an end portion of the LED wiring and an end portion of the grounding line so as to be connected to the main circuit board.

According to an aspect of the invention, another grounding line, may be further formed on a second surface of the base and is connected to the grounding line formed on the first surface of the base.

According to an aspect of the invention, the liquid crystal display device may further comprise a driving device for driving the liquid crystal panel, wherein the driving device is formed on the LED circuit board.

According to the liquid crystal display device of the embodiments of the present invention as described above, static electricity that has flowed into the chassis may be safely grounded using a simple structure, thereby preventing damage of electronic components in the liquid crystal display device due to static electricity.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF CERTAIN INVENTIVE EMBODIMENTS

Figure 1:
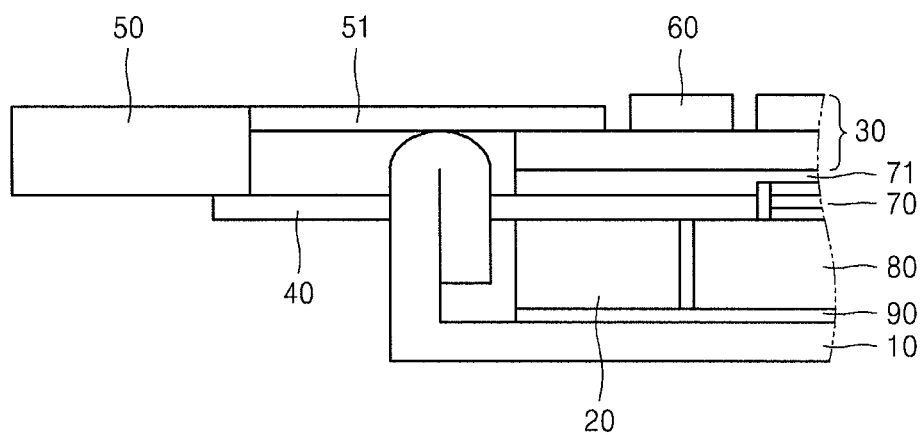
FIG. 1 is a cross-sectional view partially illustrating a liquid crystal display device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a cross-sectional view partially illustrating a liquid crystal display device according to an embodiment of the present invention.

The liquid crystal display device illustrated in FIG. 1 includes a chassis 10 that forms a frame, a light emitting diode (LED) unit 20, and a LCD panel 30 installed within the chassis 10, and a main circuit board 50 connected to the LED unit 20 and the LCD panel 30. The LCD panel 30 forms an image according to the control of a driving device 60. The LED unit 20 irradiates backlight to the LCD panel 30.

The liquid crystal display device includes an optical sheet 70, a panel sheet 71, a light guide plate 80, and a reflector 90.

The liquid crystal display device includes a LED circuit board 40 including a LED chip for controlling the LED unit 20. A flexible printed circuit board (FPCB) 51 connects the driving device 60 and the main circuit board 50.

The LED circuit board 40 is installed so as to electrically contact the chassis 10. Accordingly, when static electricity flows into the chassis 10, the static electricity may flow through the LED circuit board 40.

Figure 2:
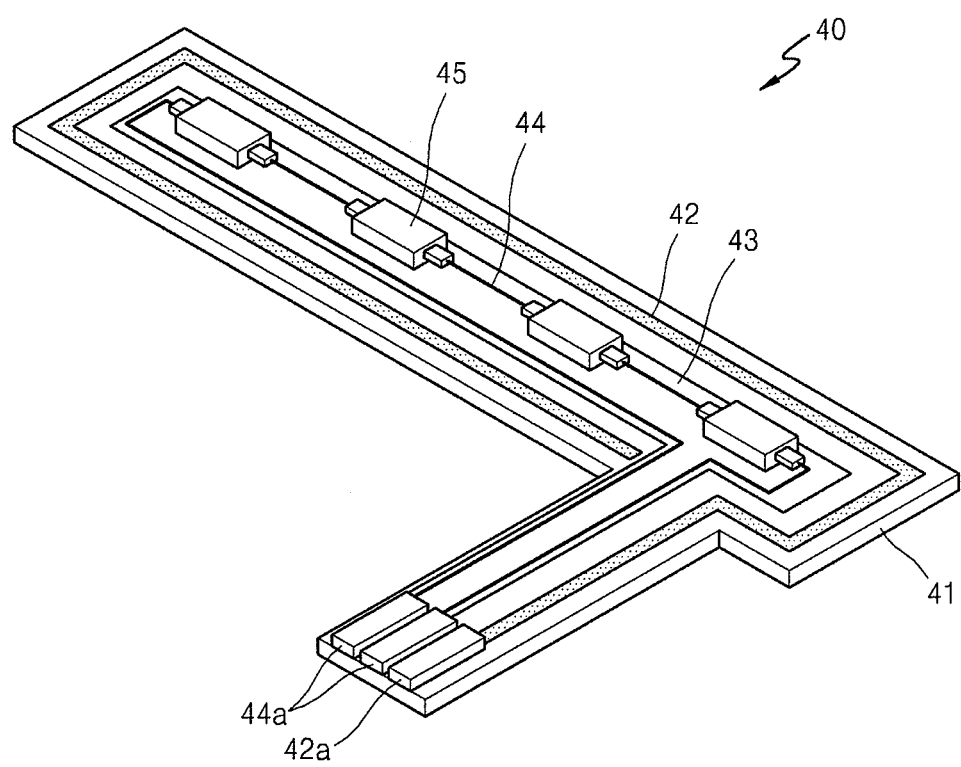
FIG. 2 is a perspective view schematically illustrating a structure of a light emitting diode (LED) circuit board of the liquid crystal display device of FIG. 1, according to an embodiment of the present invention.

As shown in FIG. 2, the LED circuit board 40 includes a grounding line 42 that induces the static electricity, which has flowed through the chassis 10, to the main circuit board 50. FIG. 2 is a perspective view schematically illustrating a structure of a light emitting diode (LED) circuit board 40 of the liquid crystal display device of FIG. 1, according to an embodiment of the present invention.

That is, as illustrated in FIGS. 1 and 2, the LED circuit board 40 includes a base 41 as a main body, a LED wiring 44, and the grounding line 42 formed on the base 41 in the same layer as the grounding line 42. A cover lay layer 43 covers the LED wiring 44. An LED chip 45 is connected to the LED wiring 44. The LED wiring 44 is connected to the main circuit board 50 through a LED pin 44a so as to form a signal transmission line of the LED chip 45. The grounding line 42 flows out static electricity to the main circuit board 50 through a grounding pin 42a formed at an end portion of the grounding line 42.

The LED circuit board 40 may be manufactured as follows. The grounding line 42 and the LED wiring 44 are disposed on a first surface of the base 41. That is, the base 41 is coated with a copper thin layer and patterned so as to form the LED wiring 44 and the grounding line 42 in the same layer as the grounding line 42. Also, the cover lay layer 43 is formed on the LED wiring 44. The LED chip 45 is connected to the LED wiring 44. Then, by installing the LED pin 44a and the grounding pin 42a, the LED circuit board 40 including the grounding line 42 is completed.

When the liquid crystal display device having the above-described structure is used, and when static electricity flows into the chassis 10, the static electricity flows through the grounding line 42 of the LED circuit board 40 that electrically contacts the chassis 10, and then to the main circuit board 50 that is directly connected to the grounding pin 42a. In the shown embodiment, the main circuit board 50 is grounded.

Accordingly, if the above-described grounding line 42 is not present, the static electricity may flow into electronic components such as the LED chip 45 of the LED circuit board 40 or the driving device 60 disposed thereon and damage them. However, according to the shown embodiment of the present invention, the static electricity may be directly discharged to the main circuit board 50 through the grounding line 42 of the LED circuit board 40. Thus, damage to the electronic components due to the static electricity may be prevented previously. Also, the grounding line 42 is simply added to the LED circuit board 40, and thus the liquid crystal display device does not have a complicated structure.

Whether product defects due to static electricity are generated in the liquid crystal display devices has been tested; specifically, in the case of a liquid crystal display device that does not include the grounding line 42 in the LED circuit board 40, LEDs are not lighted even when static electricity exceeds just 10 kV. However, in the liquid crystal display device according to the current embodiment of the present invention that includes the grounding line 42, no defects are generated even for static electricity of 15 kV. Accordingly, electronic components in the liquid crystal display device may be protected from static electricity.

Figure 3:
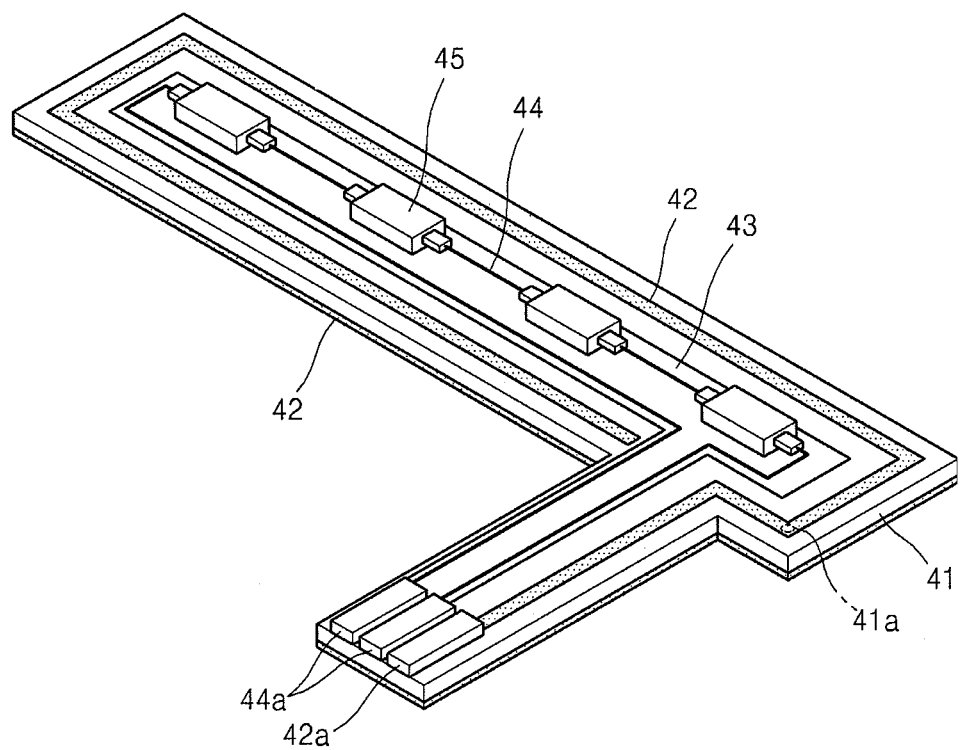
FIG. 3 is a perspective view schematically illustrating the LED circuit board of FIG. 2, according to another embodiment of the present invention.

Meanwhile, in the current embodiment, the grounding line 42 is formed only on the first surface of the base 41. However, as illustrated in FIG. 3, the grounding line 42 may be formed on both surfaces of the base 41.

That is, the first surface of the base 41 may have the structure as illustrated in FIG. 2, and the grounding line 42 may be formed entirely on a second surface of the base 41. By connecting the grounding line 42 on both surfaces via a via-hole 41a, a wider grounding line 42 than that of FIG. 2 is formed. Then, a grounding pin 42a and a LED pin 44a are respectively formed at ends of the grounding line 42 and the LED wiring 44, and thus a LED circuit board having a broad grounding line 42 is formed.

When static electricity flows from the outside into the chassis 10 of the liquid crystal display device in which the above-described LED circuit board 40 is used, the static electricity flows through the grounding line 42 of the LED circuit board 40 that electrically contacts the chassis 10. Then the static electricity immediately flows out through the main circuit board 50 that is connected to the grounding line 42a.

Accordingly, if the grounding line 42a is not present, the static electricity may flow in the electronic components such as the LED chip 45 of the LED circuit board 40 and the driving device 60 disposed thereon and damage the electronic components. However, according to the current embodiment of the present invention, static electricity may be discharged through the grounding line 42 of the LED circuit board 40 to the main circuit board 50, and thus damage to the electronic components due to static electricity may be prevented previously. Also, here, the grounding line 42 is simply added to the LED circuit board 40, and thus the liquid crystal panel device does not have a complicated structure.

Accordingly, according to the liquid crystal display device of the embodiments of the present invention, static electricity that has flowed into the chassis 10 from the outside may be immediately discharged, thereby protecting electronic components in the liquid crystal display device from static electricity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid crystal display device comprising:
   a liquid crystal panel on which an image is formed;
   a light emitting diode (LED) unit to irradiate a backlight to the liquid crystal panel;
   a chassis in which the liquid crystal panel and the LED unit are installed;
   a LED circuit board including an LED chip that is installed to electrically contact the chassis and to control the LED unit; and
   a main circuit board connected to the liquid crystal panel and to the LED circuit board,
   wherein a grounding line connected to the main circuit board is formed on the LED circuit board and is spaced apart from the LED chip,
   wherein the LED circuit board comprises a base, the grounding line formed on a first surface of the base, a LED wiring formed on the first surface of the base and forms a signal path of the LED chip, a cover lay layer covering the LED wiring, and an LED pin and a grounding pin that are respectively formed at an end portion of the LED wiring and an end portion of the grounding line so as to be connected to the main circuit board,
   wherein another grounding line is further formed entirely on a second surface of the base and is connected to the grounding line formed on the first surface of the base via a via-hole.

2. The liquid crystal display device of claim 1, further comprising a driving device to drive the liquid crystal panel, wherein the driving device is formed on the LED circuit board.

3. The liquid crystal display device of claim 1, wherein the base is coated with a copper thin layer.

4. A light emitting diode (LED) circuit board disposed on a liquid crystal display device including a main circuit board, the LED circuit board comprising:

a base including first and second surfaces;
an LED chip disposed on the first surface of the base;
a grounding line formed on the first surface of the base, wherein the grounding line is spaced apart from the LED chip;
an LED wiring formed on the first surface of the base and creating a signal path of the LED chip;
a cover lay layer covering the LED wiring;
an LED pin formed at an end portion of the LED wiring to electrically connect the LED circuit board to the main circuit board; and
a grounding pin formed at an end portion of the grounding line so as to electrically connect the LED circuit board to the main circuit board of the liquid crystal display device,
wherein another grounding line is further formed entirely on the second surface of the base and is connected to the grounding line formed on the first surface of the base through a via-hole.

5. A liquid crystal display device comprising:
a liquid crystal panel on which an image is formed;
a light emitting diode (LED) unit to irradiate a backlight to the liquid crystal panel;
a chassis in which the liquid crystal panel and the LED unit are installed;
a LED circuit board including an LED chip and a grounding line, the LED chip electrically contacting the chassis and controlling the LED unit, and the grounding line disposed along a first surface of the LED circuit board and dissipating static electricity throughout the chassis, wherein the grounding line is spaced apart from the LED chip,
wherein another grounding line is formed entirely on a second surface of the base, opposite to the first surface, and is connected to the grounding line formed on a first surface of the base through a via-hole.

* * * * *